Figure 1:
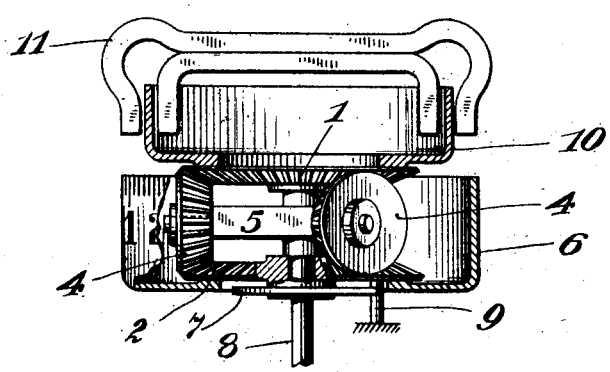

May 10, 1927.

G. RAMSEY

SPEEDOMETER

Filed Nov. 24, 1925

1,628,271

George Ramsey
INVENTOR

Patented May 10, 1927.

1,628,271

UNITED STATES PATENT OFFICE.

GEORGE RAMSEY, OF BROOKLYN, NEW YORK.

SPEEDOMETER.

Application filed November 24, 1925. Serial No. 71,088.

This invention relates to speedometers and more especially to a speedometer adapted for use on automotive vehicles.

Heretofore in the speedometer art the inertia of the moving parts has acted to tend to retard the action of the instrument and has acted to further increase the tendency of the instrument to lag behind the true speed when the speed was accelerating either positively or negatively. In some cases the organization of gearing required the gearing to be such as to drive the speedometer at high speed. In automotive devices of this kind as part of the driving connections, flexible shafts are usually used and it is not desirable to run such shafts at high speed. Furthermore, rapid change of speed is liable to brake the flexible shaft because this shaft is usually attached to revolving parts that are so arranged as to heavily resist sudden changes in rotative movement.

The present device is so organized that the inertia of certain moving parts tends to cause the indicator to compensate for the tendency of the dynamic elements to lag during either positive or negative acceleration, thus the device tends to indicate true speeds when the speed is variable or changing. Furthermore, the driving mechanism for the dynamic elements being thus constructed, yielding or flexible, shocks due to rapid or sudden changes in speed are absorbed without causing undue stress on the driving connections.

In the form of the invention disclosed, the moving system of the speedometer embodies means to produce a force which is a function of the speed of a rotating part, such as a rotatable eddy current member comprising a rotating disk or drum and a suitable stationary magnet. A scale member, which may be in the form of a cylinder, or in the form of an indicating hand, is biased toward a zero position by a suitable metering spring. Mechanical connection between the scale member and the rotatable eddy current member is effected by means of a differential gear unit which may consist of three elements, viz, two main gears and a set of planetary gears. The flexible shaft from the vehicle wheel is connected to rotate the planetary gears; the eddy current member is mounted to rotate with one of the main gears; and the scale member is connected to the other of the main gears.

The principal object of the present invention is to provide a speedometer or the like which will accurately indicate speeds at times when the speed is changing.

An important object of the invention is to provide a method of diminishing the effect of inertia of the moving system of a speedometer or the like.

Another object of the invention is to provide a speedometer or the like in which the moving system is of very light weight.

A further object of the invention is to provide a speedometer organization which will absorb the shocks incident to sudden changes of speed, thus preventing undue strain of various parts.

Other objects of the invention will be apparent from the following description.

Fig. 1 of the drawings is a diagrammatic sectional view illustrating one embodiment of the present invention.

Figure 2:
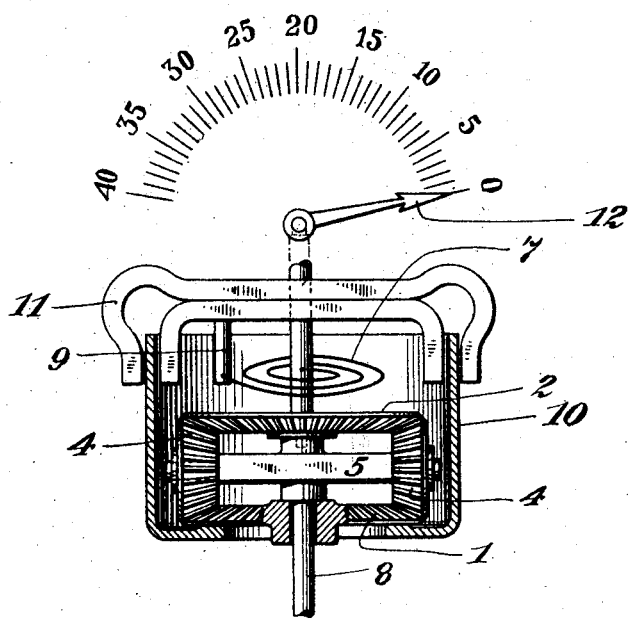

Fig. 2 is a diagrammatic view similar to Fig. 1 and illustrating a slightly different form of the invention.

Referring to Fig. 1, the speedometer comprises a differential gear unit consisting of a main gear 1, a second main gear 2, and a planetary train consisting of any suitable number of gears 4 mounted upon a rotatable frame 5. Attached to main gear 2 is a cup shaped scale member 6 adapted to be marked with a suitable scale on its exterior cylindrical surface. This scale member 6 is capable of limited rotary movement and is biased toward its zero position by suitable means for measuring turning moment such as a metering spiral spring 7 attached at one end to the gear 2 and at the other end to the anchor 9. Attached to main gear 1 is a cup shaped eddy current member 10 which is adapted to be braked by a suitable stationary magnet 11. The planetary train consisting of gears 4, is adapted to be rotated by the shaft 8 which is connected to the rotatable frame 5 and with a vehicle wheel or the like through suitable gearing and a flexible shaft well known in the art (not shown). This arrangement gives a speed ratio between shaft 8 and eddy current member 10 of 1:2.

The operation of the device under constant speed condition varies somewhat from its operation under conditions of acceleration. The operation will first be considered with particular reference to constant speed, and then with particular reference to acceleration.

In response to the rotation of shaft 8, gears 4 of the planetary train are driven in an orbital path at an angular speed equal to the speed of shaft 8. Under constant speed conditions gear 2 is stationary since the drag upon the eddy current member 10 is balanced by the metering spring 7; and hence gears 4 drive gear 1 and eddy current drum 10 at a speed equal to twice the speed of shaft 8. Due to the motion of the eddy current drum member 10 through the field of magnet 11, a retarding or braking force is imposed on the eddy current drum member proportional to the speed of the member, as is well understood in the art. This retarding force is, in effect, transmitted through gears 4 to main gear 2 in the form of a turning moment. This turning moment is opposed by the metering spring 6 and causes a displacement of the indicator member 6 from its zero position.

The magnitude of the braking force exerted by magnet 11 on the drum 10 is dependent upon the speed of the eddy current drum member, which in turn is dependent upon the speed of shaft 8 and the road wheel to which it is connected, that is, when the speedometer is used on an automobile. Therefore, the displacement of the scale member measures the speed of shaft 8, and likewise measures the speed of the wheel to which the shaft is connected. At constant speed the force exerted on indicator scale member 6 is constant; and for convenience this force at any given uniform speed may be termed the "normal indicating force," without regard to what the speed may be. Likewise the moment of "the normal indicating force" may be termed the "normal indicating moment."

When an increase of speed occurs, gear 2 and indicator scale member 6 must be advanced in order to indicate the increased speed. This necessitates the exertion of force to overcome the inertia of these parts; and it is, therefore, obvious that during a positive acceleration the scale member will lag behind the speed unless the "normal indicating moment" is temporarily supplemented by a moment which will overcome the effect of this inertia. An increase in the speed to be measured also causes an increase in the speed of gear 1 and eddy current drum 10 and these parts likewise have inertia which tends to cause them to lag. This inertia manifests itself as a temporary retarding force which supplements the retarding force of magnet 11, thus temporarily increasing the indicating moment transmitted to indicator scale member 6. By making gear 1 and eddy current member 10 of proper weight relative to the weight of gear 2 and indicator scale member 6, the inertia of the one group compensates for the inertia of the other, thus causing the instrument to indicate accurately during the interval of increasing speed. On a decrease in speed the inertias compensate in a similar manner; and hence correct speed indication is likewise secured.

To completely overcome the tendency of the scale member to lag during acceleration, the effective retarding moment or turning moment of gear 1 (and anything attached to it) due to inertia should be equal to the retarding moment or turning moment of gear 2 (and anything attached to it) due to inertia. For any given design of speedometer, the correct ratio of moments of inertia of gears 1 and 2 can be readily obtained by constructing a specimen with gear 1 too light to give complete compensation and then gradually loading it until the instrument indicates correctly during periods of acceleration. All speedometers of that design can then be constructed with the same ratio of moments of inertia between gears 1 and 2 (including any part attached to the gears) as in the specimen.

The magnet is the only part of the instrument which needs to be made of heavy weight, and since this is stationary the connecting shaft 8 does not have to have any heavy part. This construction minimizes the strain on this shaft, particularly during periods of acceleration. Furthermore, the action of the differential gear is such that there is a positive drive to only one of the main gears at any one time. This means that a sudden increase of speed of shaft 8 requires a sudden advance of only one of the main gears. Gear 2 and the indicator scale member may be made of very light weight, thus enabling them to advance suddenly without straining the connecting shaft 8.

In the form of the invention shown in Fig. 2, an indicating hand 12 is used as a scale member instead of the cup-shaped scale member shown in Figure 1.

The arrangement of gears is similar to that shown in Fig. 1 and the speed ratio between the drive shaft of the speedometer and the eddy current member is the same, viz, 1:2.

The invention has been described with particular reference to uses as a speedometer for motor vehicles or the like. However, it is quite apparent that the speed of a motor vehicle in miles per hour is related to the speed of rotation of the wheels by a mere multiplying factor. Therefore, by suitable calibration, the instrument can be used to indicate miles per hour, revolutions per minute, or other function of the speed of any rotating machine part. Therefore, the word "speedometer" as used herein is to be taken as including tachometers or other devices for indicating a function of the speed of a rotating machine part.

It is realized that the invention may be embodied in forms other than those particularly disclosed, and hence it is desired that the disclosure be considered as illustrative and not as limiting.

Having thus described my invention, what I claim is:

1. In a speedometer, a differential gear unit comprising a pair of main gears and a planetary train, an eddy current member mounted to rotate with one of said main gears, a stationary magnet adapted to brake said eddy current member, a scale member mounted to rotate with the other of said main gears, means to bias said scale member in a particular position, and means to rotate the planetary train in response to the rotation of a machine part.

2. In a speedometer, a differential gear unit comprising a pair of main gears and a planetary train, an eddy current member attached to one of said main gears, a stationary magnet adapted to brake said eddy current member, a scale member attached to the other of said main gears, means to bias said scale member in a particular position, and a shaft adapted to connect said planetary train with a rotation machine part whereby the planetary train is driven in response to the rotation of a machine part.

3. In a speedometer, a differential gear unit comprising a pair of main gears and a planetary train, means to apply a braking force to one of said main gears, a scale member mounted to rotate with the other of said main gears, means to bias said scale member in a particular position, and means to rotate the planetary train in response to the rotation of a machine part.

4. In a speedometer, a differential gear unit comprising a pair of main gears and a planetary train, means to apply a braking moment to one of said main gears which is proportional to the speed of rotation of said main gear, a scale member mounted to rotate with the other of said main gears, means to bias said scale member in a particular position, and means to rotate the planetary train in response to the rotation of a machine part.

GEORGE RAMSEY.